(12) United States Patent
Jäger

(10) Patent No.: US 9,370,752 B2
(45) Date of Patent: Jun. 21, 2016

(54) AERATION ELEMENT FOR THE GASIFICATION OF LIQUIDS

(71) Applicant: Artemis Rubber Technology, Inc., Longmont, CO (US)

(72) Inventor: Claudius Jäger, Boulder, CO (US)

(73) Assignee: Artemis Rubber Technology, Inc., Longmont, CO (US)

( * ) Notice: Subject to any disclaimer, the term of this patent is extended or adjusted under 35 U.S.C. 154(b) by 373 days.

(21) Appl. No.: 13/843,625

(22) Filed: Mar. 15, 2013

(65) Prior Publication Data

US 2014/0264965 A1    Sep. 18, 2014

(51) Int. Cl.
*B01F 3/04* (2006.01)
*C02F 3/20* (2006.01)

(52) U.S. Cl.
CPC ............. *B01F 3/04269* (2013.01); *C02F 3/201* (2013.01); *B01F 2003/04148* (2013.01); *B01F 2003/04177* (2013.01); *B01F 2003/04191* (2013.01); *B01F 2003/04276* (2013.01); *B01F 2003/04312* (2013.01); *Y02W 10/15* (2015.05)

(58) Field of Classification Search
CPC ............ C02F 3/20; C02F 3/201; C02F 3/203; C02F 3/208
USPC .......... 210/220; 261/122.2, 124, 122.1, 121.1
See application file for complete search history.

(56) References Cited

U.S. PATENT DOCUMENTS

| | | | | |
|---|---|---|---|---|
| 5,015,421 | A * | 5/1991 | Messner | 261/122.1 |
| 7,497,421 | B2 * | 3/2009 | Jager | 261/122.2 |
| 2008/0251954 | A1 * | 10/2008 | Casper et al. | 261/122.1 |

FOREIGN PATENT DOCUMENTS

| | | | |
|---|---|---|---|
| DE | 3319161 A1 | * | 11/1984 |
| DE | 3600234 A1 | * | 7/1987 |

* cited by examiner

*Primary Examiner* — Duane Smith
*Assistant Examiner* — Adam W Bergfelder
(74) *Attorney, Agent, or Firm* — Jennifer S. Stachniak

(57) ABSTRACT

An aeration element for gasification or aeration of liquids includes an essentially flattened, rigid support element having a substantially oval cross-section and corrugated outer surfaces, the corrugated outer surfaces including ridges defining grooves therebetween; a threaded opening for receiving a cooperating fitting for connection to an air supply; and a flexible membrane of elastomeric material disposed around the support element, The membrane has a plurality of slits, and wherein compressed gas is introduced between the support element and the membrane, the gas can escape via these slits into the surrounding liquid. A retaining clamp holds the membrane around at least one end of the support element. A check valve assembly prevents backflow of liquid, particles, sludge or debris into the interior of the support element.

20 Claims, 28 Drawing Sheets

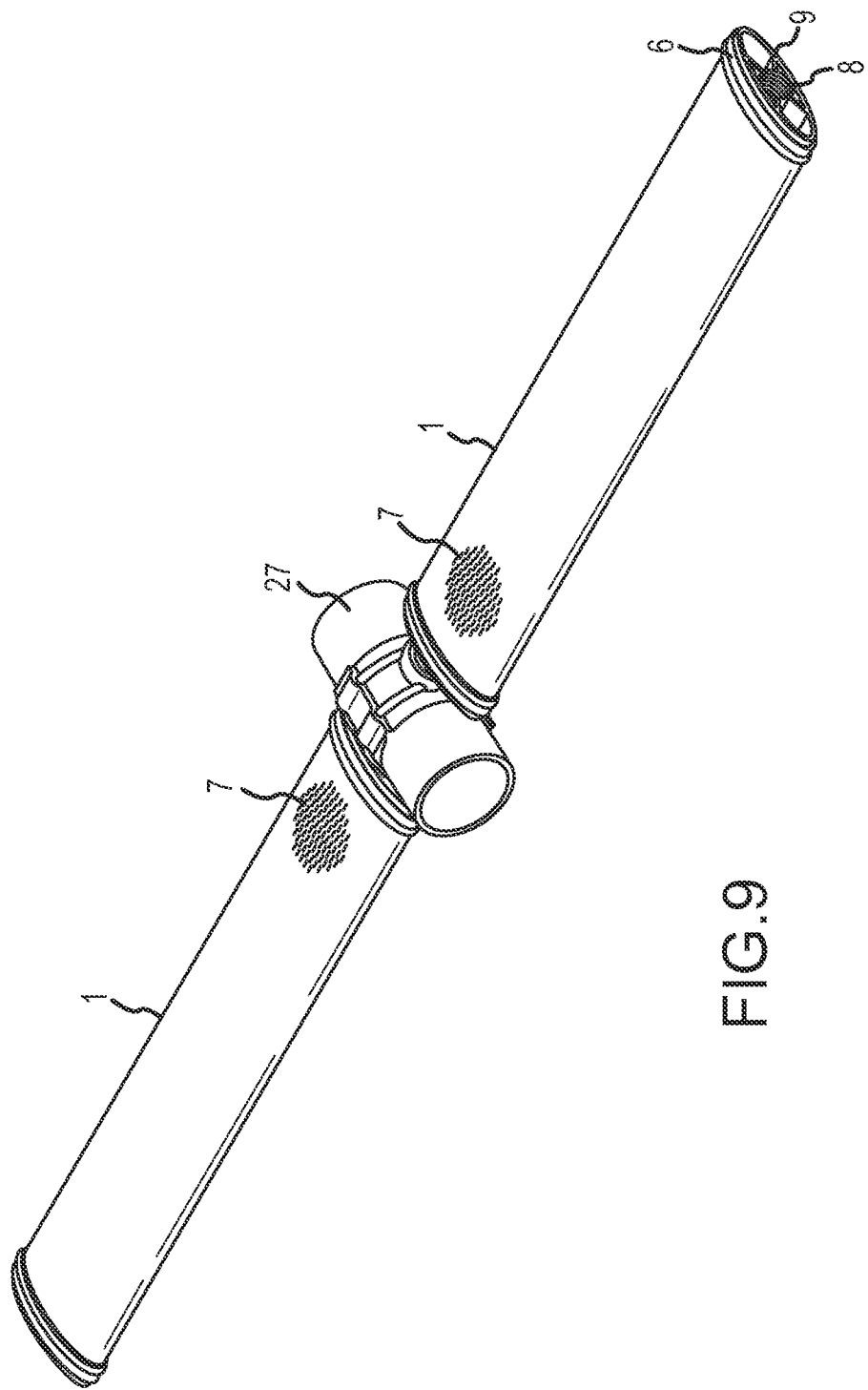

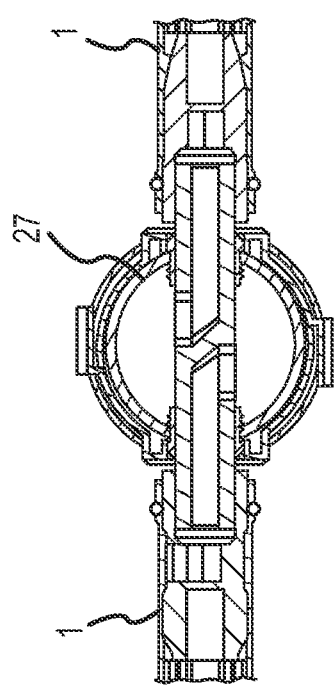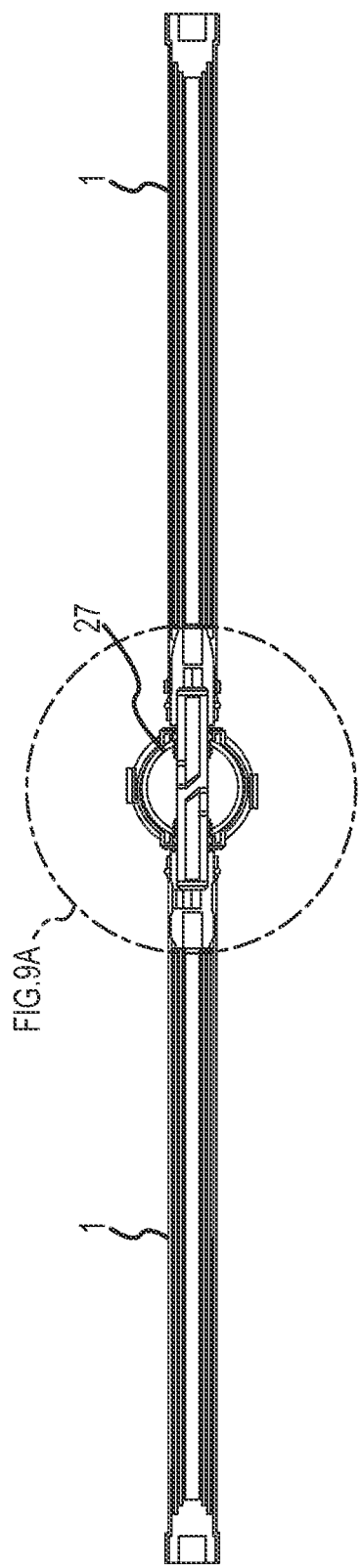

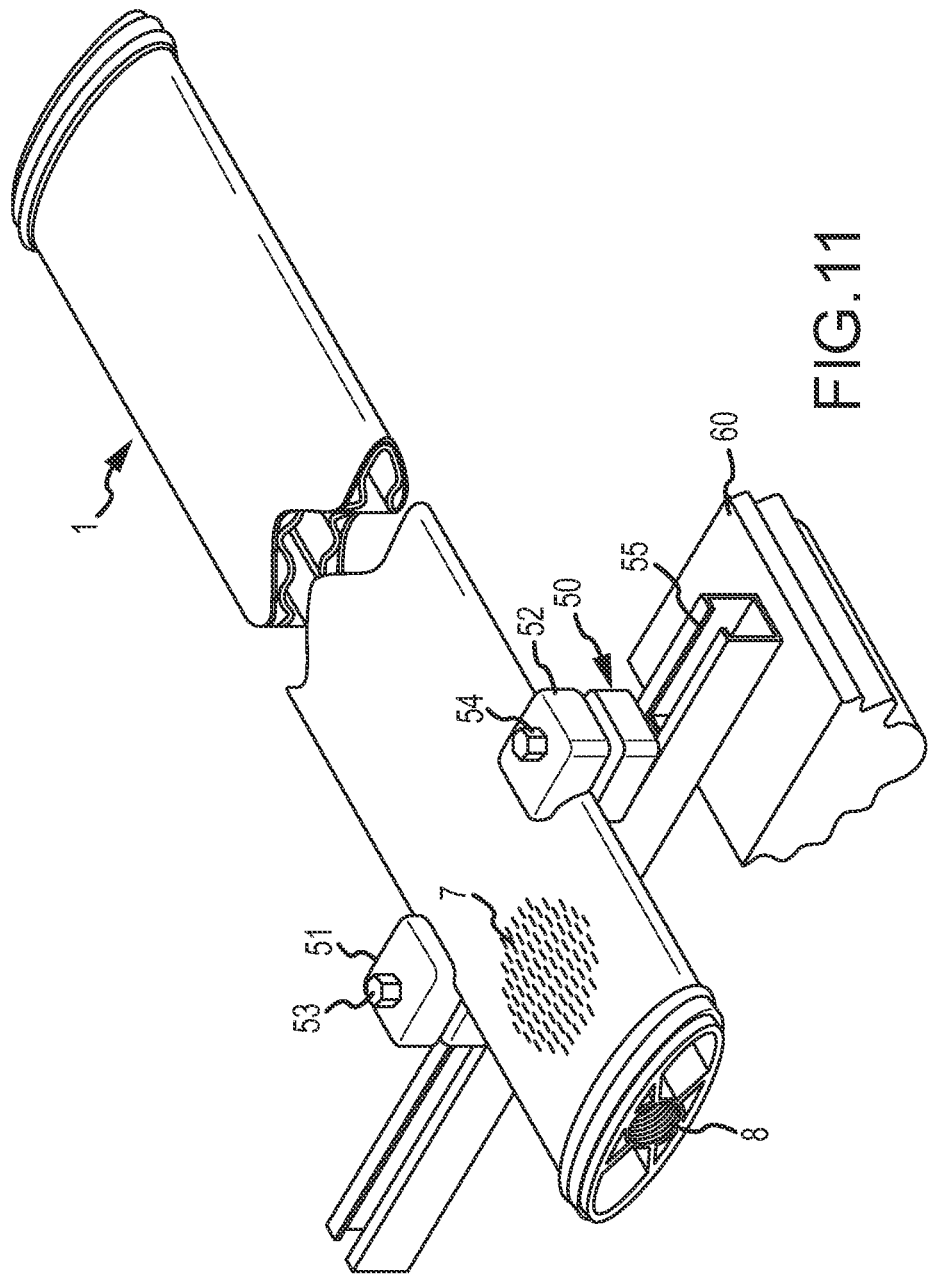

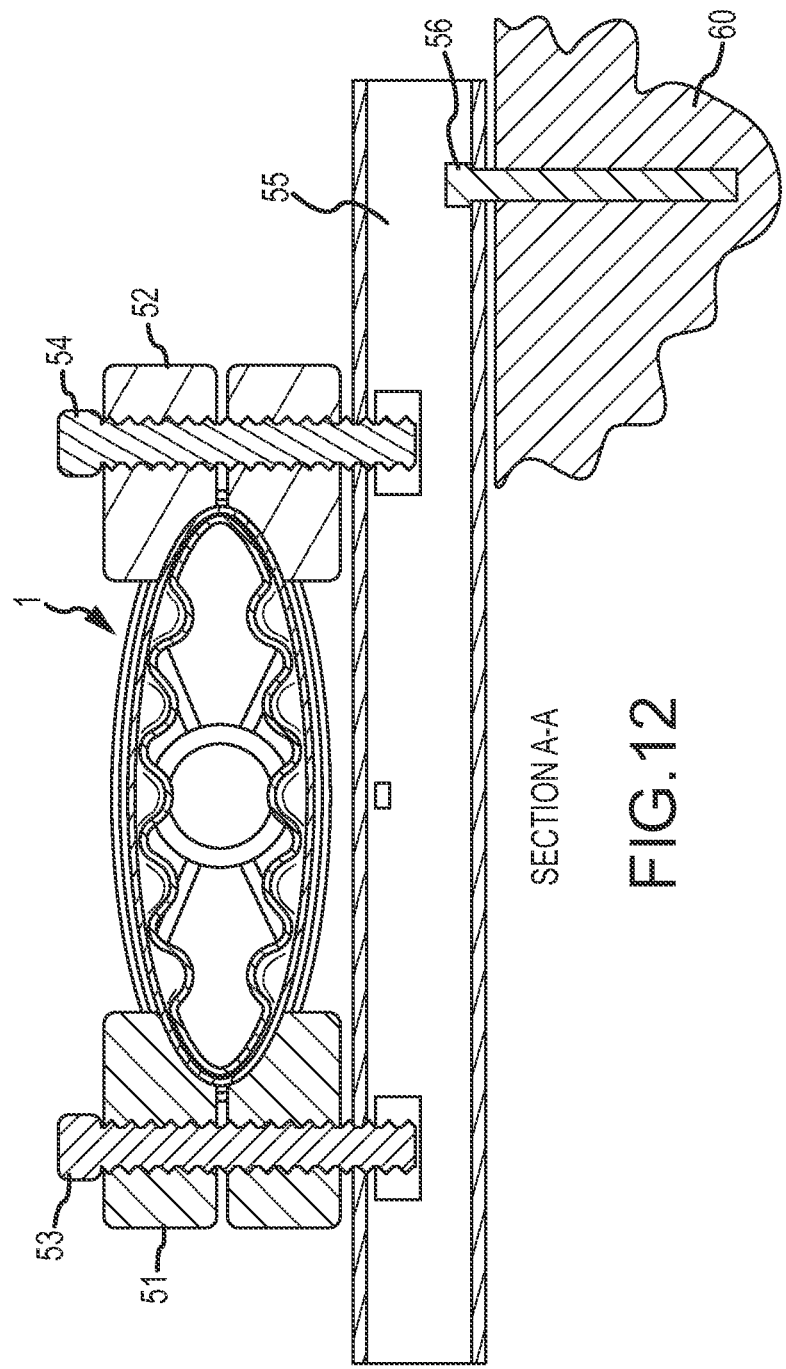

AERATION ELEMENT FOR THE GASIFICATION OF LIQUIDS

BACKGROUND OF THE INVENTION

The present invention relates to an aeration element that is utilized in an aeration element for the gasification of liquids, especially for the aeration of water.

Such apparatus are used, for example, in clarification plants. A plurality of aeration elements are disposed on a distribution conduit, whereby the distribution conduit on the one hand serves for the supply of air or gas to the aeration elements, and on the other hand also serves for the securement of the aeration elements. A plurality of distribution conduits can in turn be combined to form a system.

U.S. Pat. No. 5,015,421 to Messner describes a diffusion device that uses a flexible membrane on a rigid, plate-like aeration support element. Due to the structure of the rigid plate that serves as a substrate for the flexible membrane, when the aerating gas bubbles are released through openings provided in the membrane, or when the flow of aerating gas is stopped, the membrane can crease or wrinkle at specific points along the supporting plate, thus causing fatigue and wear at these points and reduced longevity of the aeration element.

An elongated aeration element is disclosed in DE 33 19 161A1. In addition, DE 36 00 234 discloses an apparatus for the aeration of water, according to which individual aeration elements are connected with the distribution conduit via fittings that during assembly are pressed into a bore in the distribution conduit accompanied by elastic deformation, thereby forming a positive connection. However, the aeration elements are plate-shaped elements. Such a connection is not suitable for elongated aeration elements, which can have an aeration length of up to and greater than one meter. When the apparatus moves or if there are flows in the liquid that is to be aerated, the long aeration elements act like lever arms, so that the forces that occur at the connection locations are much greater than is the case with plate-shaped aeration elements.

U.S. Pat. No. 7,497,421 (U.S. '421) by the same inventor describes an apparatus for gasification of liquids, the disclosure of which is incorporated herein by reference. U.S. '421 describes a device in which compressed gas is introduced into a tubular aeration element made up of rigid support tube with a lengthwise, rounded groove and a flexible membrane disposed around the tube. The gas escapes via slits in the membrane. A specialized fitting is provided for attaching the aeration element to a distribution conduit. The tubular aeration element, however, is limited in its aerating efficiency, due to the limited cross sectional area provided for releasing the aerating gas and bubbles into the surrounding volume of liquid.

None of the above art provides an elongated, flattened aeration element with an oval cross section and increased surface area efficiency, which is specifically designed to allow a flexible membrane placed around a support member to expand and collapse during operation without fatigue, wear, and a shortened longevity of the aeration element components.

Further, none of the above cited art provides a means for preventing sludge or other particles from entering the interior of the aeration element during use, which can impair or completely inhibit functioning. This can occur if there is a breach of the membrane by an external impact of a sharp object or debris in the surrounding liquid. A backflow of particles or sludge is inhibited by the fine slits of the perforated membrane, acting as check valves in a deflated state of the membrane.

It is therefore an object of the present invention to provide a more efficient aeration element that has a greater cross sectional area available, that offers greater longevity and resilience, and which is capable of being mounted in new or existing aeration systems in a variety of configurations.

SUMMARY OF THE INVENTION

The object of the present invention is realized with a flattened, elongated aeration element having support member with a substantially oval cross-section, an elastomeric and flexible tubular membrane having air slits provided only on a top surface of the aeration element when the membrane is placed around the aeration element, and an air inlet with a threaded connection to connection the aeration element to a distribution conduit that serves for the supply of gas or air.

The support member of the aeration element is made up of a rigid, hard plastic material having a corrugated, hollow profiled and with corrugated outer surfaces, such that a plurality of grooves are formed between the ridges of the corrugated surfaces, both on the inner and outer surfaces of the support member.

The aeration element is provided with a clamp for retaining in place the membrane and further, the support includes a machine bead to prevent the clamp from slipping and to maintain the membrane under an axial, lengthwise tension, thereby preventing the membrane from slipping off the support member during use.

The aeration element can be provided with a check valve in the form of an opening in the upper surface of support member which works in cooperating with a flexible, elastomeric membrane or flap to perform a back flow or check valve function that presents sludge and other materials, in the event the membrane was accidentally breached, or cut by an hard object floating in the sludge or during assembly of the system or operators servicing the system. However, liquid from condensation, or backflow through the membrane is prevented from entering into the air supply system when the air is shut off during a intermitted cycle for de-nitrification and/or an anaerobic phase of the operating batch cycle of the biological processes sequence.

The aeration element further is provided with a mounting or support bracket for supporting or fixing in position the end(s) of the elongated aeration element when in use in an aeration system in a clarification tank or pool/pond, for example, by securing the mounting or support bracket to a floor or other surface of the tank or pool.

Pursuant to a particularly advantageous embodiment of the invention, aeration elements are respectively disposed in pairs on opposite locations on the distribution conduit, whereby in a given cross-sectional plane, the distribution conduit is provided at two oppositely disposed locations with bores through which a single bolt passes that connects the two aeration elements with one another. In this way, the support of the bolt relative to the wall of the distribution conduit is effected by the respective other aeration element. The aeration elements thus reciprocally support one another, and the apparatus can make do with a minimum number of parts.

Further specific features of the invention will be described in detail subsequently.

BRIEF DESCRIPTION OF THE DRAWINGS

This object, and other objects and advantages of the present invention, will appear more clearly from the following specification in conjunction with the accompanying schematic drawings, in which:

FIG. 9 is a plan view of two inventive aeration elements connected on opposite sides of a distribution conduit;

FIGS. 9A-9D are cross sectional and top views of the two aeration elements of FIG. 9 showing their connection and positioning relative to the distribution conduit, as well as an arrangement of a plurality of such pairs of aeration elements along a common distribution conduit;

FIG. 11 is a plan view of an inventive aeration element positioned in a mounting assembly;

FIG. 12 is a further cross sectional view of the mounting assembly of FIG. 11;

DESCRIPTION OF PREFERRED EMBODIMENTS

Figure 1:
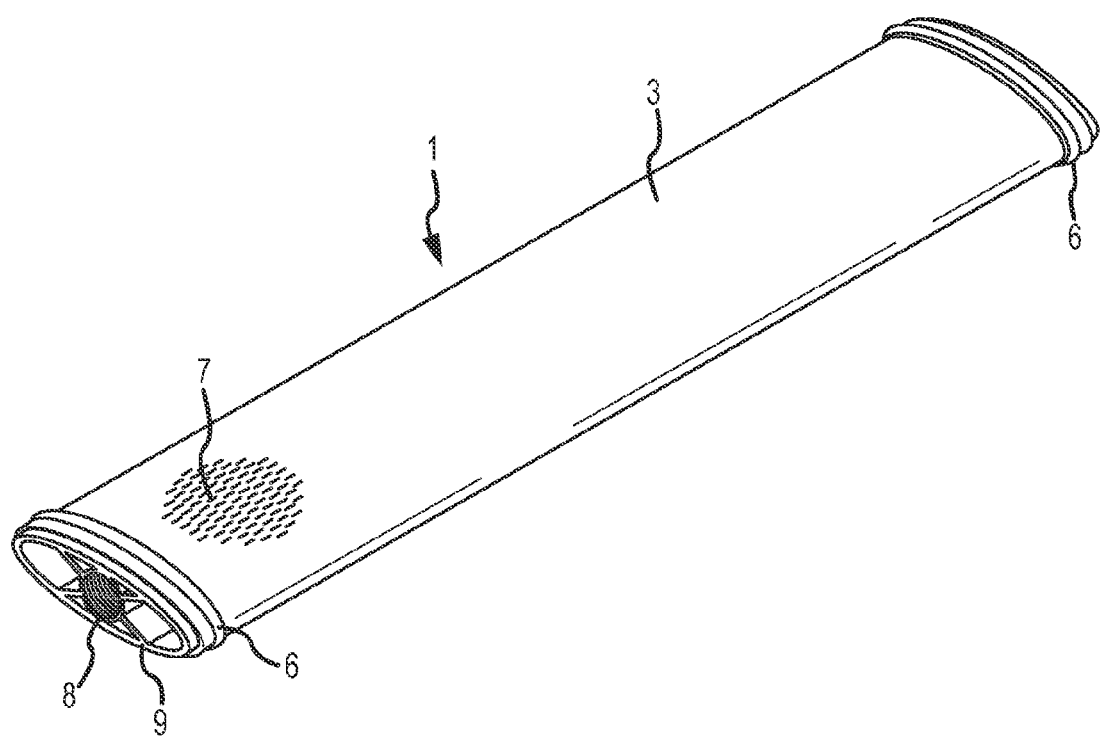
FIG. 1 shows a plan view of the inventive aeration element.
Figure 2:
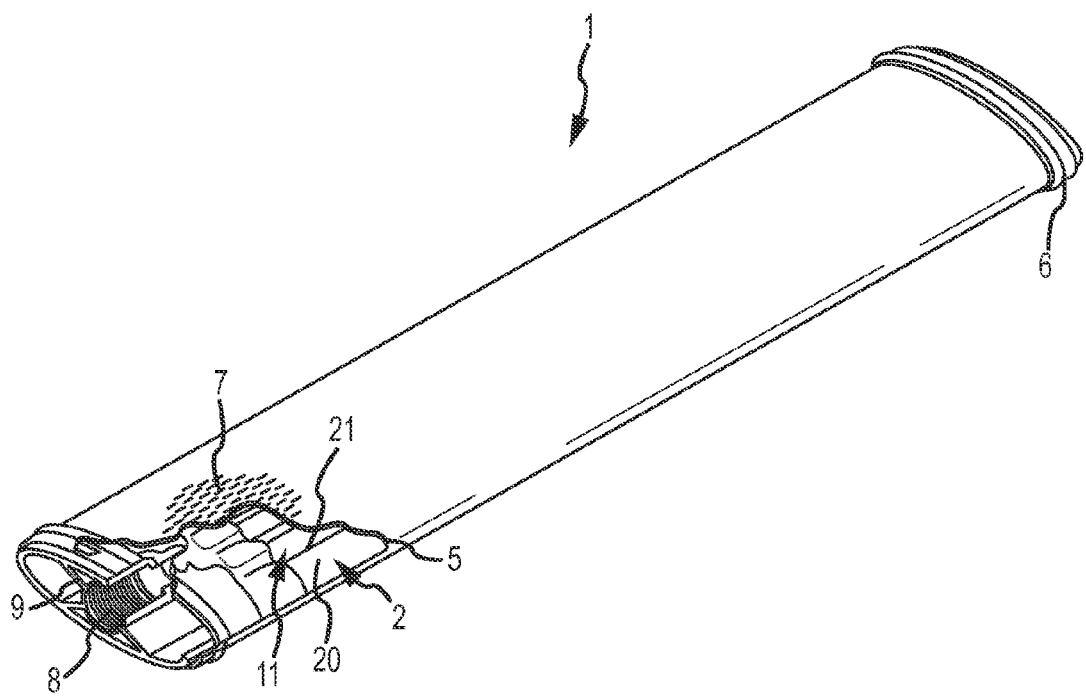
FIG. 2 is a plan view of the aeration element with a cutaway of the outer membrane.

Referring now to the drawings in detail, in particular FIGS. 1 and 2, the elongated, flattened diffuser aeration element 1 of the present invention has an essentially flattened, rigid support element 2 with an essentially oval cross-section. As can be seen in FIG. 2, the support element 2 with the oval cross-section has a hard, rigid corrugated hollow profile 11, such that opposite surfaces 3, 4 (upper and lower surfaces, respectively as shown in FIGS. 1 and 2) of the support element provided corrugated surfaces with raised portions or ridges 20 and channels or grooves 21 disposed therebetween.

A sleeve 5, or flexible membrane, is disposed about the support element 2 and secured around at least one end of the support element 2 by a clamp 6 made of stainless steel or another material, which is positioned to hold the sleeve 5 in place in an airtight manner against the support element 2. The sleeve 5 includes perforations in the form of slits 7 which are positioned only on the upper surface 3 of the support element 2 when the sleeve 5 is in place around the support element 5. The sleeve 5 preferably is made of a material such as EPDM, silicone, polyurethane, polymeric thermoset, and thermoplastic elastomers.

Figure 3:
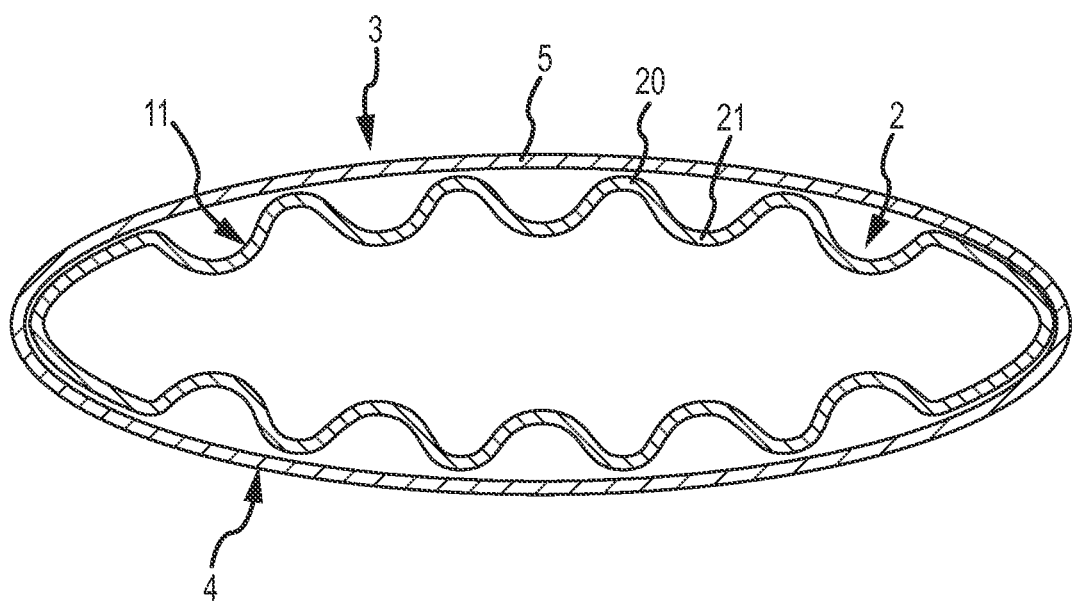
FIG. 3 is a lengthwise cross-section of the aeration element of FIG. 1 with the flexible membrane disposed around it in an inflated state.
Figure 3A:
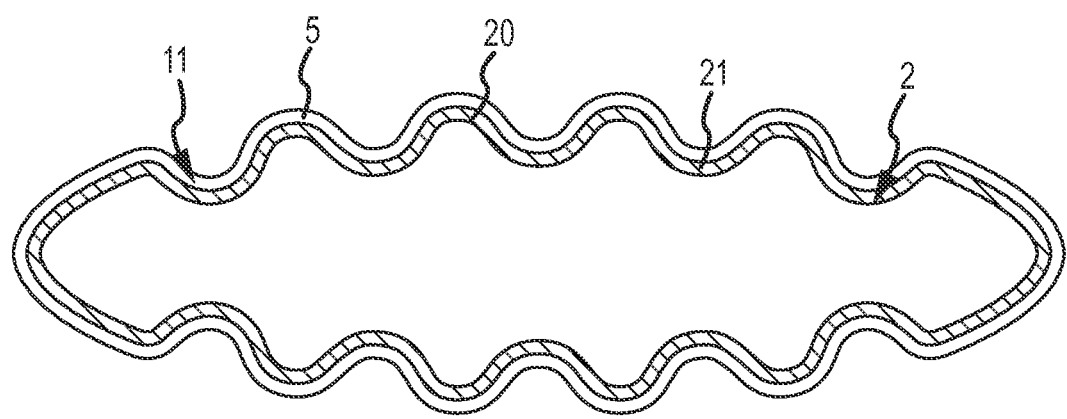
FIG. 3A is a lengthwise cross-section of the aeration element of FIG. 1 with the flexible membrane disposed around it in a deflated state.
Figure 7:
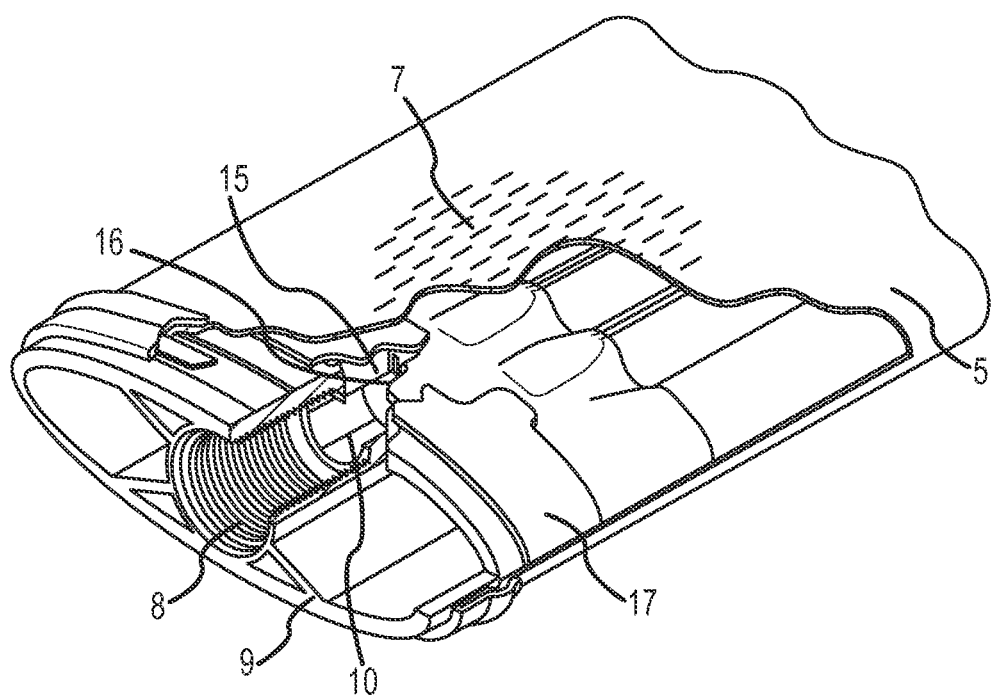
FIG. 7 is a further view of the connecting end of the aeration element with the check valve band/flap and outer membrane shown cut away to expose the air supply hole connected with the threaded air port connection.

The aeration element 1 further includes a threaded air port connection 8 for attachment to an air supply with a cooperating fitting, such as an air distribution conduit, as will be described below. Radial ribs 9 extend outwardly from the connection 9 to define opening channels and structural support for the open end of the support element 2. As shown in FIG. 7, the threaded air port connection 8 is connected to an air supply hole 10 in the support element 2, through which air supplied into the aeration element 1 flows into the support element 2. As shown in FIGS. 3 and 3A, the air supply flows between the corrugated profile 11 and the sleeve 5, causing the sleeve 5 to inflate; the air is released from the sleeve 5 into the surrounding liquid via the slits 7 formed in the sleeve 5 on the top or upper surface of the support element 2.

FIG. 3A shows the sleeve 5 in a deflated or collapsed state, in which the sleeve 5 falls onto the corrugated profile 11; this allows for a controlled radius or folding of the sleeve 5. Further, the ridges 20 and grooves 21 prevent the sleeve 5 from forming creases in the de-pressurized state thereby extending the life expectancy of the unit. During operation, the center or interior of the support element 2 is filled with water and/or sludge when the aeration element 1 is submerged. The inventive structure of the aeration element 1 provides for a reduced buoyancy of the aeration element in this submerged state. When the sleeve 5 is inflated, it expands to a cylindrical form such that corrugated profile (i.e., the ridges 20 and grooves 21) may not be evident. It has been found, surprisingly, that the invention works best when the inside circumference of sleeve 5 is equal to the outside circumference of the surface of support element 2, whether the sleeve 5 is in its inflated or non-inflated state.

Figure 4:
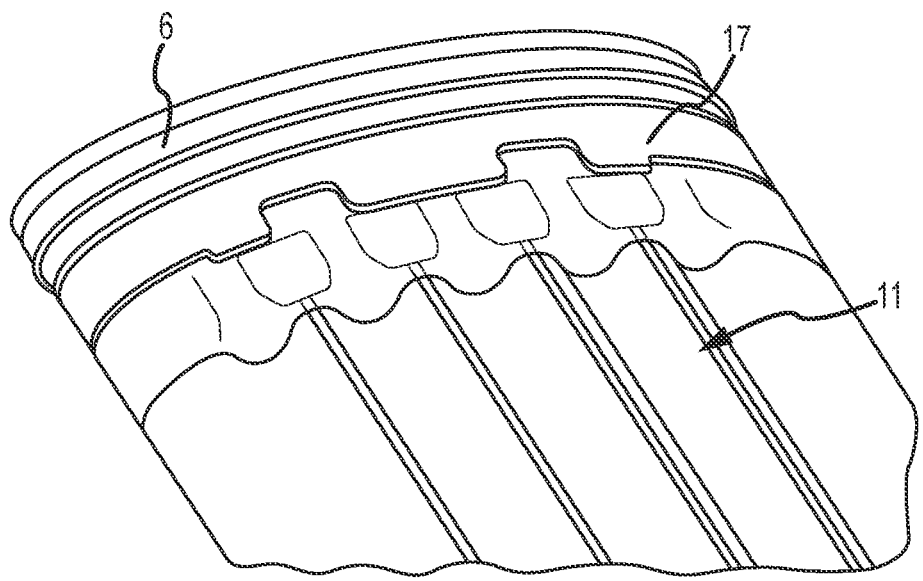
FIG. 4 is an top view of aeration element showing the retaining clamp and check valve with flexible band in place.

As shown in FIG. 4, the support element 2 includes profiled transitions or stepping 14 such that the inner diameter circumference of the sleeve 5 is equivalent to the outer diameter circumference of the corrugated profile 11 of the support element 2.

Figure 5:
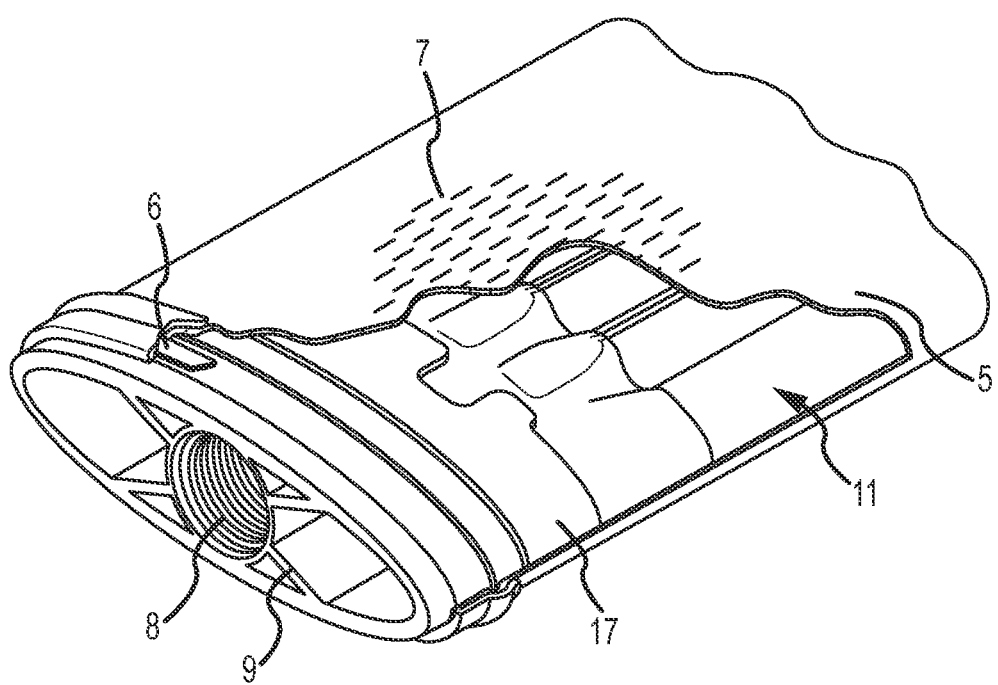
FIG. 5 is a view of the connecting end of the aeration element with the flexible membrane in a cutaway view to expose the check valve band and corrugated surface of the aeration element of FIG. 1.

FIG. 5 shows the aeration element 1 with the outer sleeve 5 cut away to reveal the support element 2 and its corrugated profile 11. The aeration element 1, in a preferred embodiment, includes a check or backflow valve assembly 15. The check valve assembly 15 includes an opening 16 and flexible, elastomeric band 17 positioned around the support element 2 to cover the opening 16 during operation of the aeration element 1. The band 17 preferably includes cut-out portions to assist in distribution air flow into the interior of the support element 2. The band or flap 17 is positioned to cover the opening 16 to prevent the debris from entering the interior of the aeration element 1 and impairing its operation, if a backflow of sludge or other debris should occur when the membrane sleeve 5 is breached or cut by external impact of debris floating in the sludge, or when the sleeve 5 is damaged externally during installation or servicing of the aeration system. To accommodate the band 17 and retain a uniform outer circumference of the support element 2, a portion of the material of the support 2 is removed from the support element 2 to form a recessed area 18 for the band 17, as can be seen from FIGS. 6 and 6A.

Figure 6:
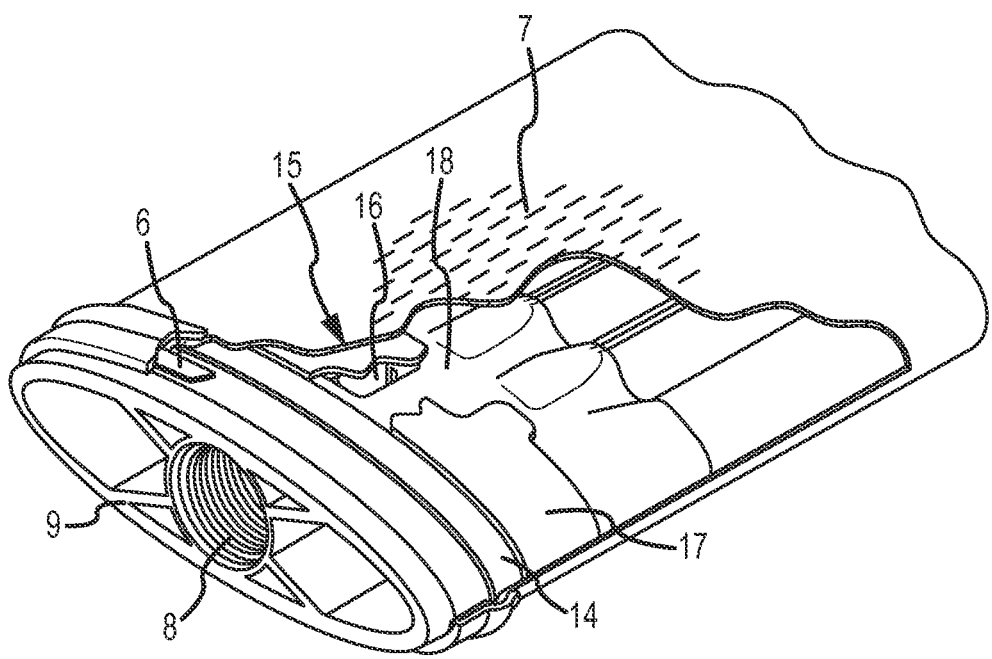
FIG. 6 shows a further view of the connecting end of the aeration element with the check valve band/flap cut away to expose the check valve opening.
Figure 6A:
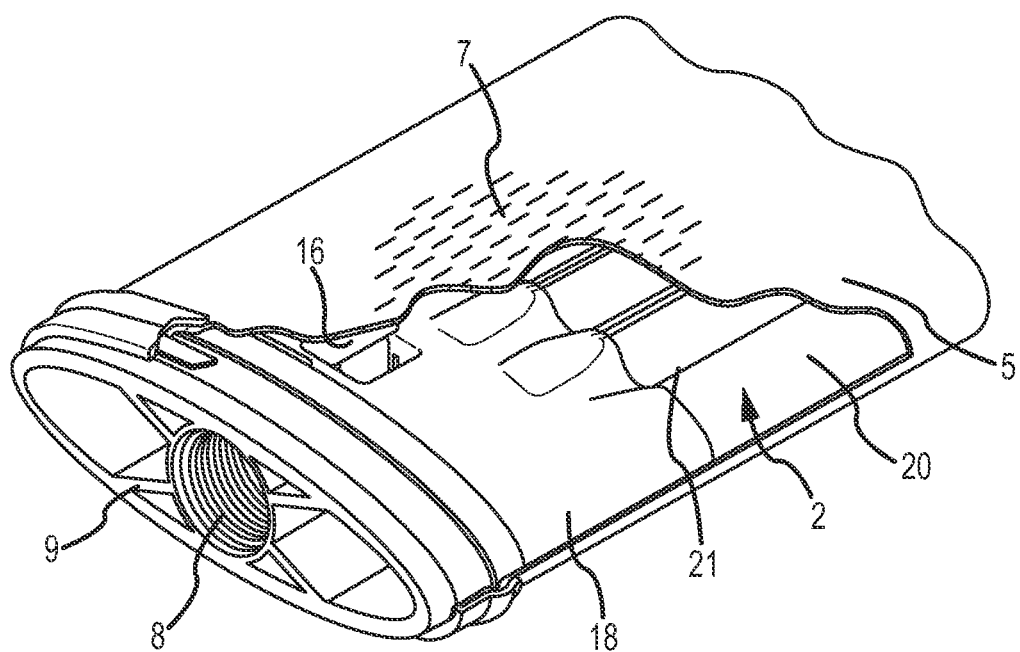
FIG. 6A shows a further view of the connecting end of the aeration element with the check valve band/flap completed removed.

FIGS. 6 and 6A show further details of the check or backflow valve assembly 16. In FIG. 6, the band 17 is shown partially cut away to expose the opening 16, while FIG. 6A shows the band 17 completely removed.

Figure 8:
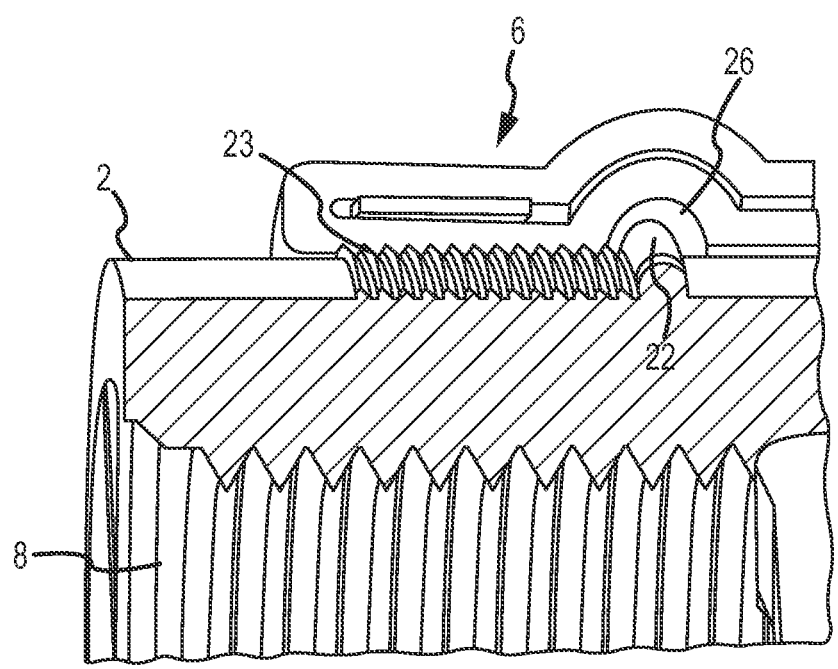
FIGS. 8 and 8A are detail views of the bead and grip ridges formed on the support member to prevent slippage of the clamp and membrane.
Figure 8A:
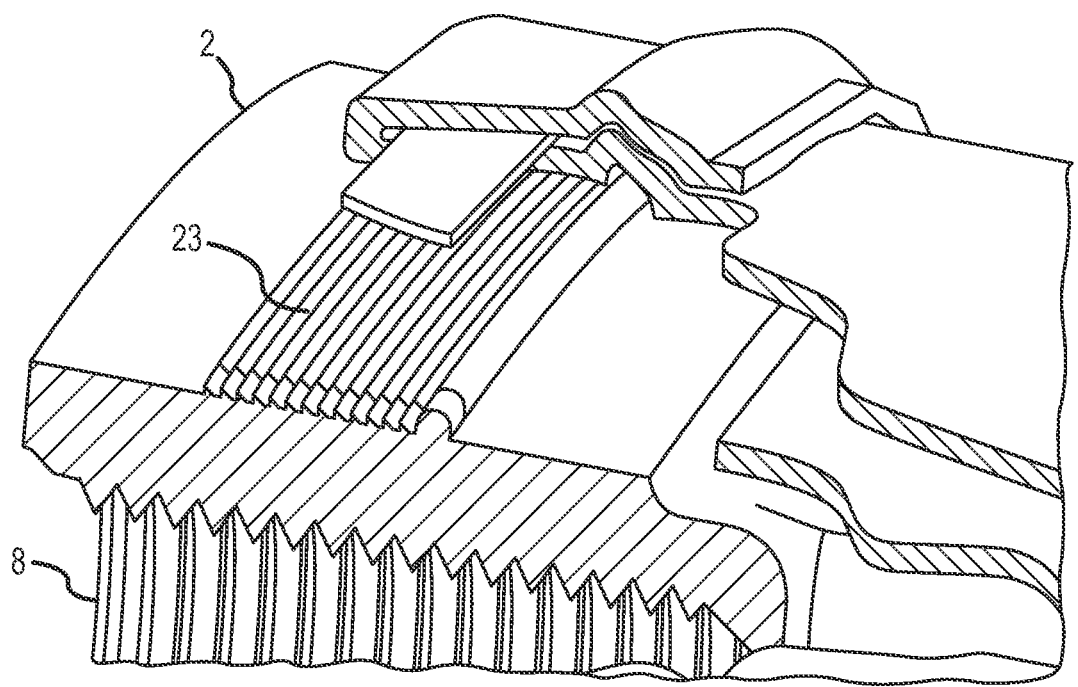

FIG. 8 shows a detail of the clamp 6, which is made of stainless steel or another material, and which is positioned near the ends of the aeration element 1 to hold the sleeve 5 in place. Preferably, the support element 2 is provided with a bead 22 that cooperates with a recess 26 on the clamp 6 to prevent the clamp 6 from slipping and to keep the sleeve 5 under an axial and longitudinal tension, thereby preventing the sleeve 5 from slipping off the support element 2. Further, the support element 2 can be provided with grips or grooves 23 to improve the air seal function of the clamp 6, which further compresses the sleeve 5 onto the support element 2 (see also FIG. 8A).

FIG. 9 shows two aeration elements 1 connected via the thread air port connection 8 to an air supply, shown here as distribution conduit 27. The air port connection 8 is configured to cooperate with a fitting to form a sealed connection to the distribution conduit 27, for example, a fitting like that disclosed in U.S. Pat. No. 7,497,421 to the same inventor, the subject matter of this patent being incorporated herein by reference. The aeration elements 1 extend perpendicular to the distribution conduit 27. The distribution conduit 27 can be equipped with a plurality of such pairs of aeration elements 1. The support element 2 is open at its ends, so that the water or other liquid that surround the aeration element has access to the interior of the support element 2. Sleeve 5, as discussed above is an elastic material, especially rubber or a rubber-like polymeric material that stretches around the surface of the flattened support element 2. When sleeve 5 is not inflated, hence when aeration is not occurring, sleeve 5 deforms to the curvatures of the surface of the flattened support element 2, but the corrugated, outside surface of support element 2 prevents crease formation in sleeve 5.

As a consequence of the above manner of construction, during operation only a small portion of the support element 2 is filled with air, and the buoyancy of the aeration element is therefore low, which is of particular advantage for very long aeration elements 1. The length of the aeration element 1 can be varied according to the application, that is, the size and volume of the area being aerated. With very long aeration elements, mounting assemblies may be utilized to fix the aeration elements to a bottom surface of the tank, pool, or other container to prevent vertical and lateral movement or buckling of the aeration elements 2 in the liquid.

Figure 9C:
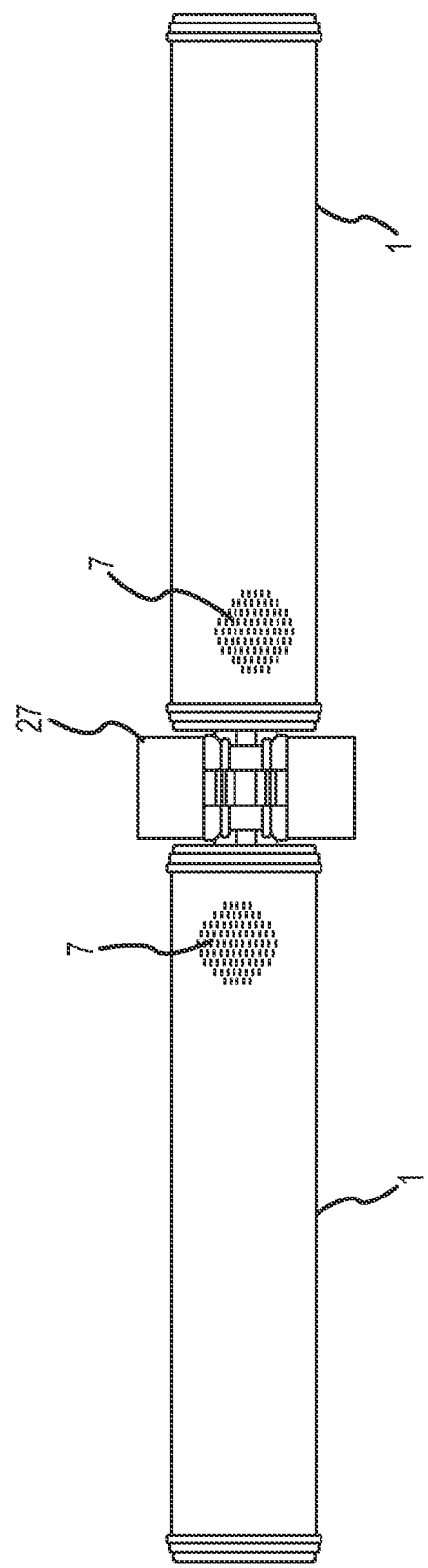

FIGS. 9A and 9B illustrate two aeration elements 2 connected to a distribution conduit 27 in cross sectional view, while FIG. 9C shows a top view of the aeration element 2 connected to the distribution conduit 27. As can be seen in FIGS. 9 and 9C, the slits 7 are evenly distributed over the entire top surface 3 of the sleeve 5, although the figures show slits 7 positioned only on a portion of the top surface 3 of the sleeve 5. Air fed into the air port connection 8 can flow through the air supply hole 10 and escapes through the slits 7 as fine bubbles into the surrounding water or liquid.

Figure 9D:
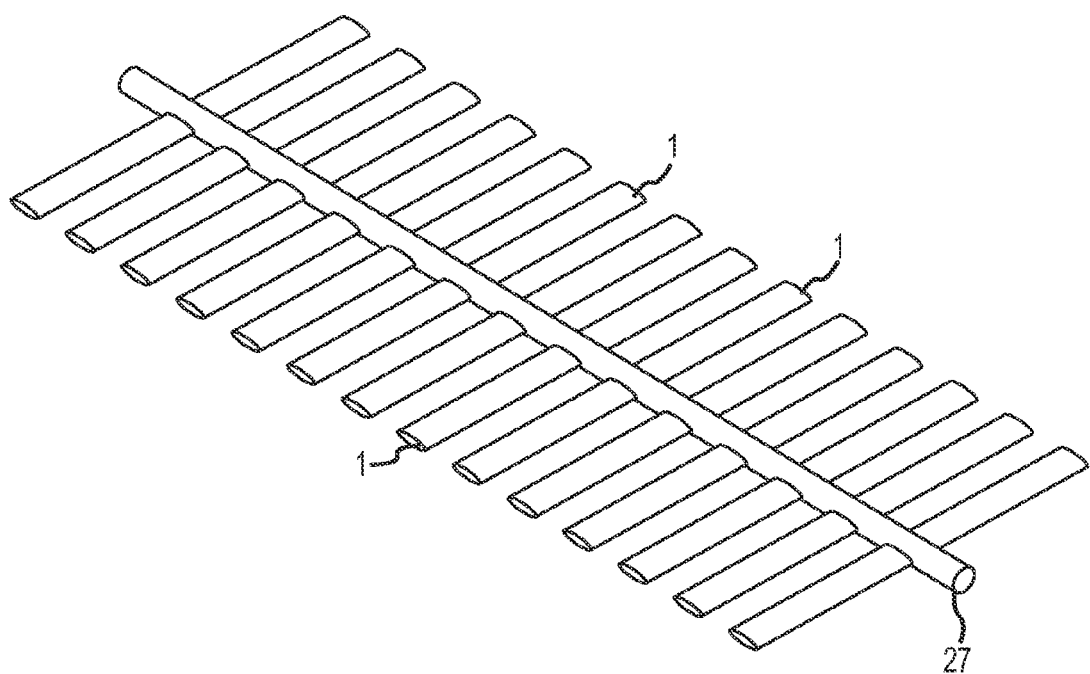

FIG. 9D shows a plurality of aeration elements 1 connected in the paired relationship of FIG. 9 along a common distribution channel 27. The aeration elements 1 can be spaced from one another, as shown in FIG. 9D, or arranged to be adjacent to one anther, as shown for example in FIG. 10.

Preferably, the connection of the aeration element 1 to an air distribution conduit 27 or other air supply or manifold is affected by connecting a cooperating, threaded fitting to form a sealed connection between the air port connection 8 and the air distribution manner by a fitting arrangement shown by way of example in FIGS. 9A through 9C.

Figure 10:
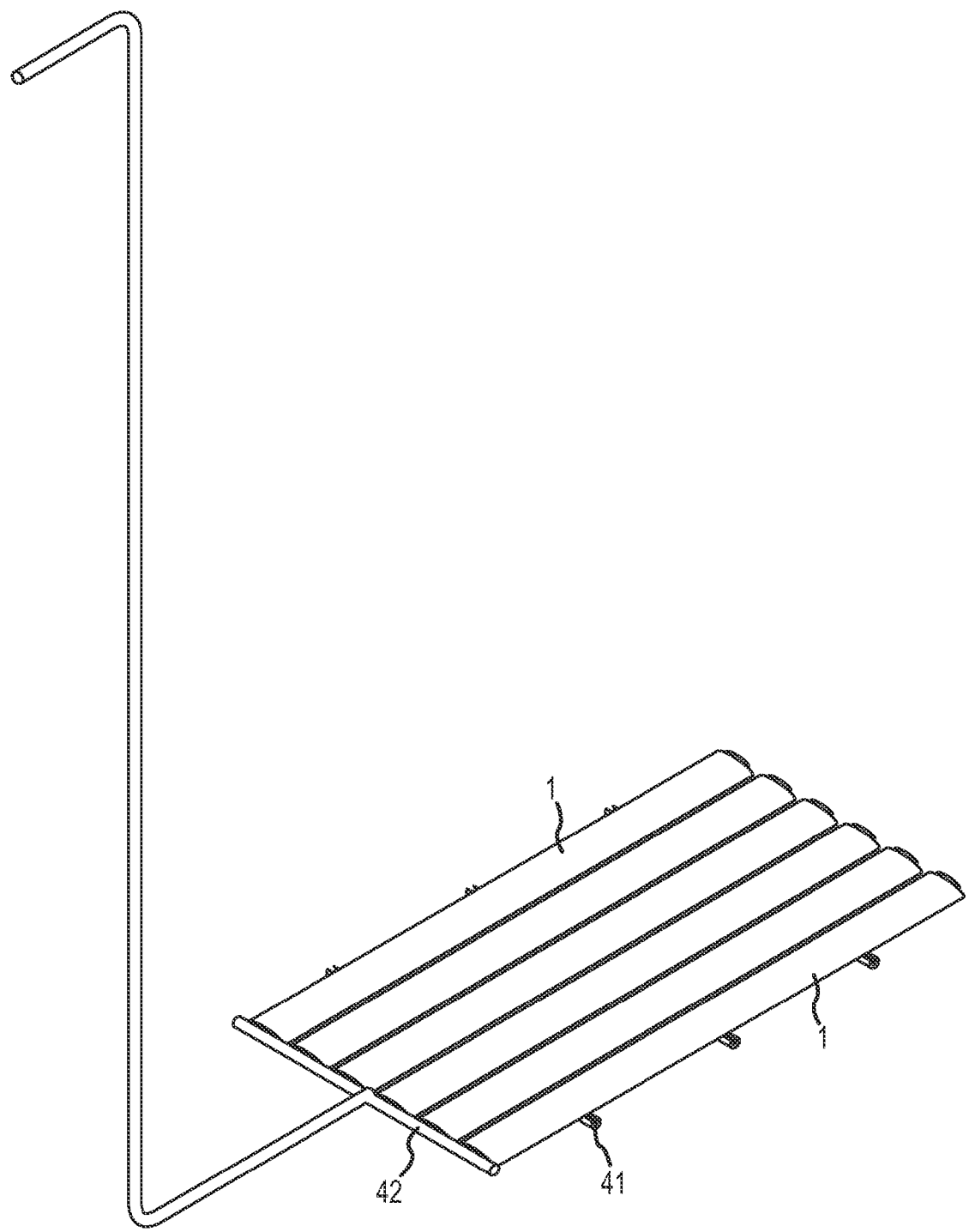
FIGS. 10-10B are plan views illustrating various embodiments for arranging a plurality of inventive aeration elements relative to a distribution conduit or other air supply device.

FIGS. 10 through 10D show a variety of contemplated configurations for arranging a plurality of the aeration elements 1 depending on the volume of liquid to be aerated and the other parameters of the specific application. As shown in FIG. 10, the aeration elements 1 can be arranged side to side on a base frame 41 or support structure and supplied with air via a common conduit 42, that in turn, is supplied with air via a supply tube, pipe or hose.

Figure 10A:
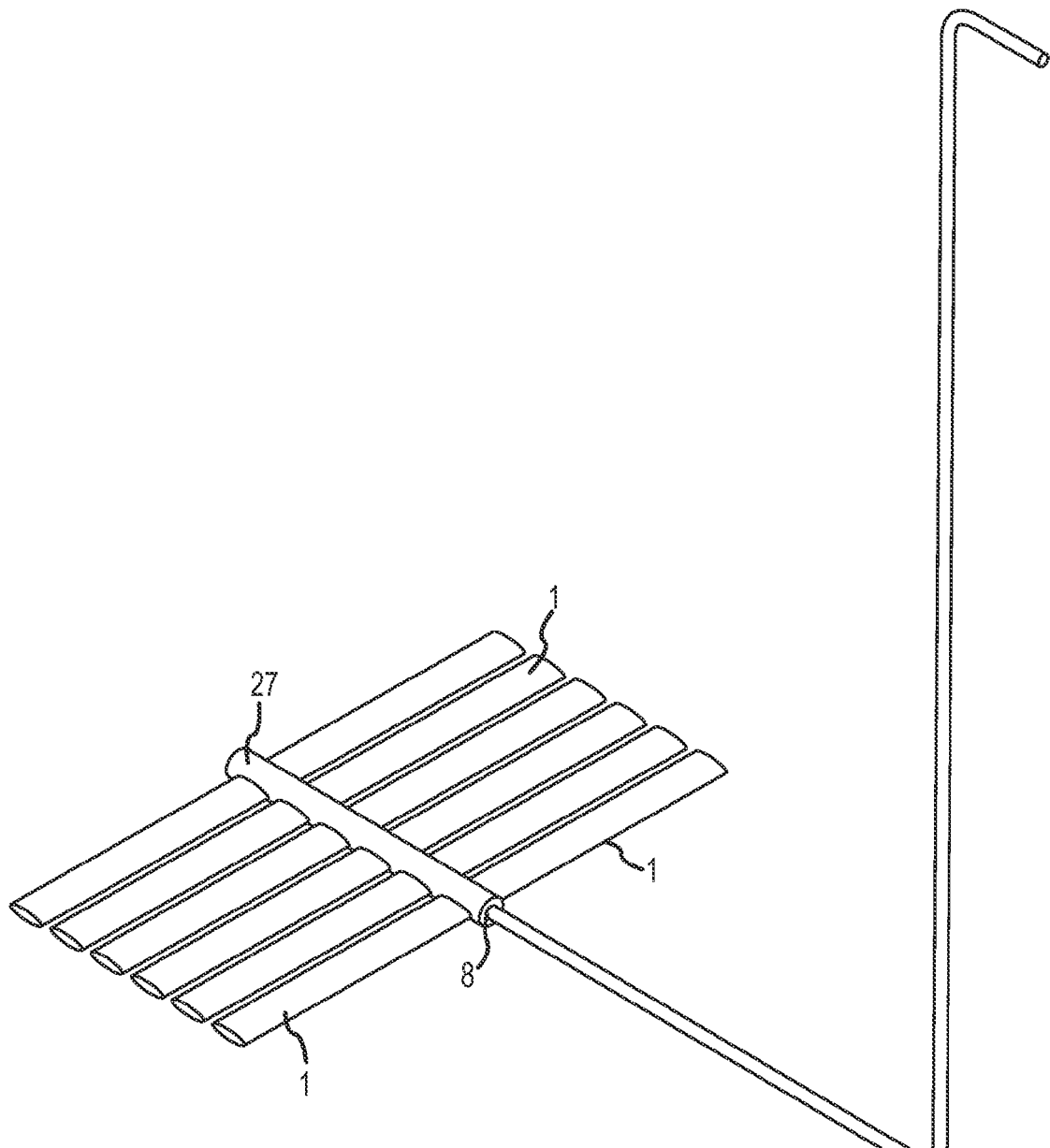

FIG. 10A shows another, possible configuration of the aeration elements 1, again, arranged side-by-side but connected to a distribution conduit 27 as shown in FIG. 9.

Figure 10B:
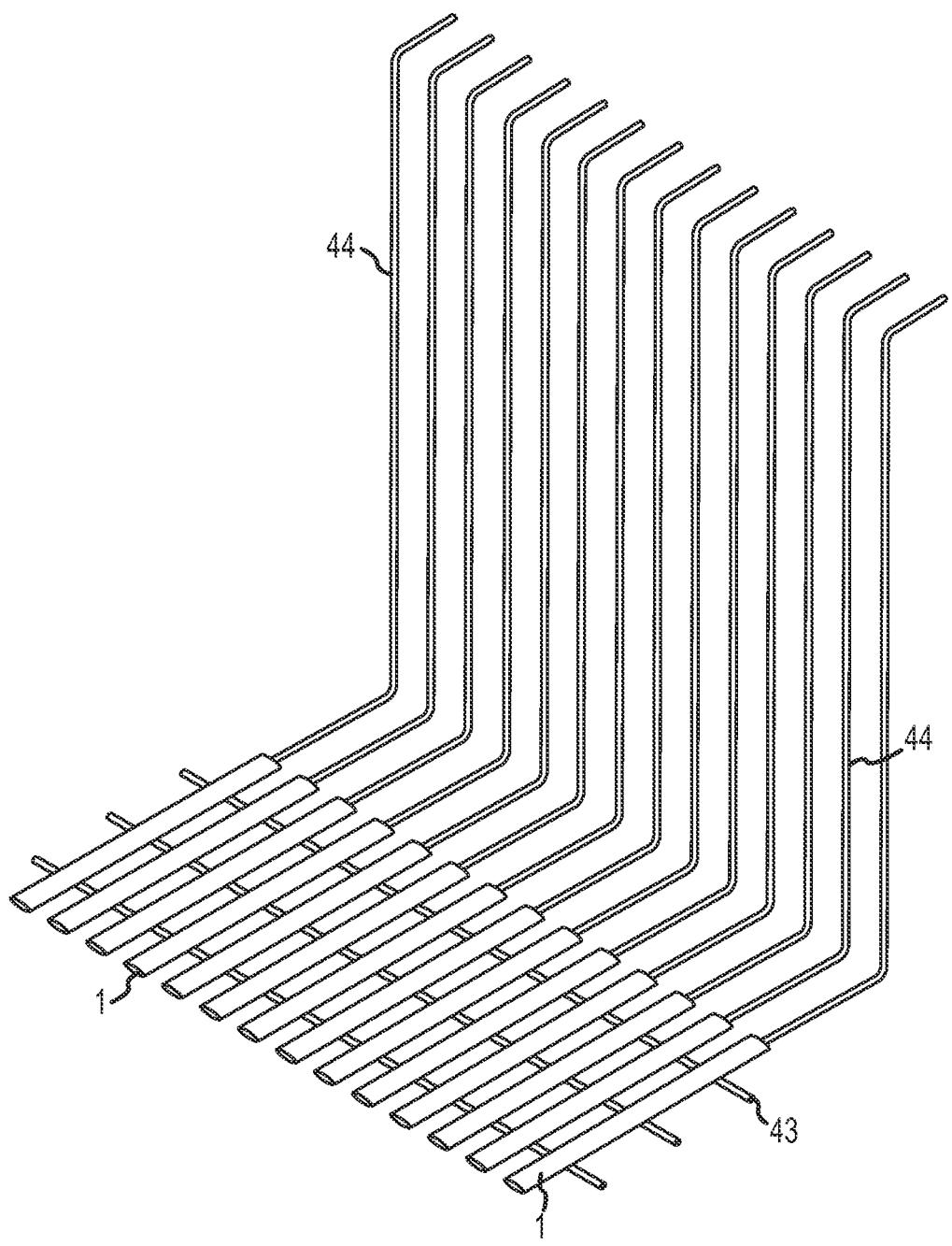

FIG. 10B shows a further configuration for the aeration elements 1, in which the elements 1 are arranged in a spaced relation on a framework or tracks 43, and with each aeration element having an individual air supply 44.

Due to the elongated nature of the aeration element 1 and in particular, when the application requires extremely long aeration elements 1, a mounting assembly may be provided to secure the aeration element(s) to a bottom surface of the container, pool, pond, etc. containing the water to be aerated. As noted above, the mounting device or bracket prevents vertical or lateral movement of the aeration element(s) 1 during use.

FIG. 11 shows an embodiment of a mounting assembly 50 for securing the aeration element 1 to the floor or bottom of the container or body of water to be aerated. The mounting assembly 50 includes flanges 51, 52 and respective cooperating bolts 53, 54 that received in a cooperating groove of a profiled bar 55. The aeration element 1 is positioned and clamped between the flanges 51, 52, and the profiled bar 55, in turn is attached via a pin or bolt 56 to the bottom surface 60 or floor of the container/body of water to be aerated.

Figure 11A:
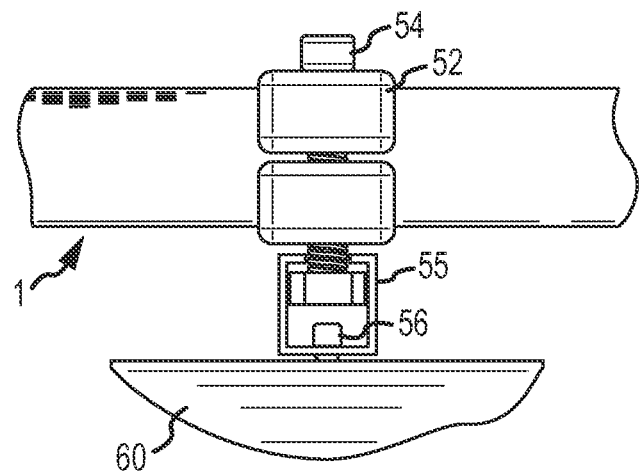
FIGS. 11A-11C are side, top, and cross sectional view, respectively, of the mounting assembly of FIG. 11.
Figure 11B:
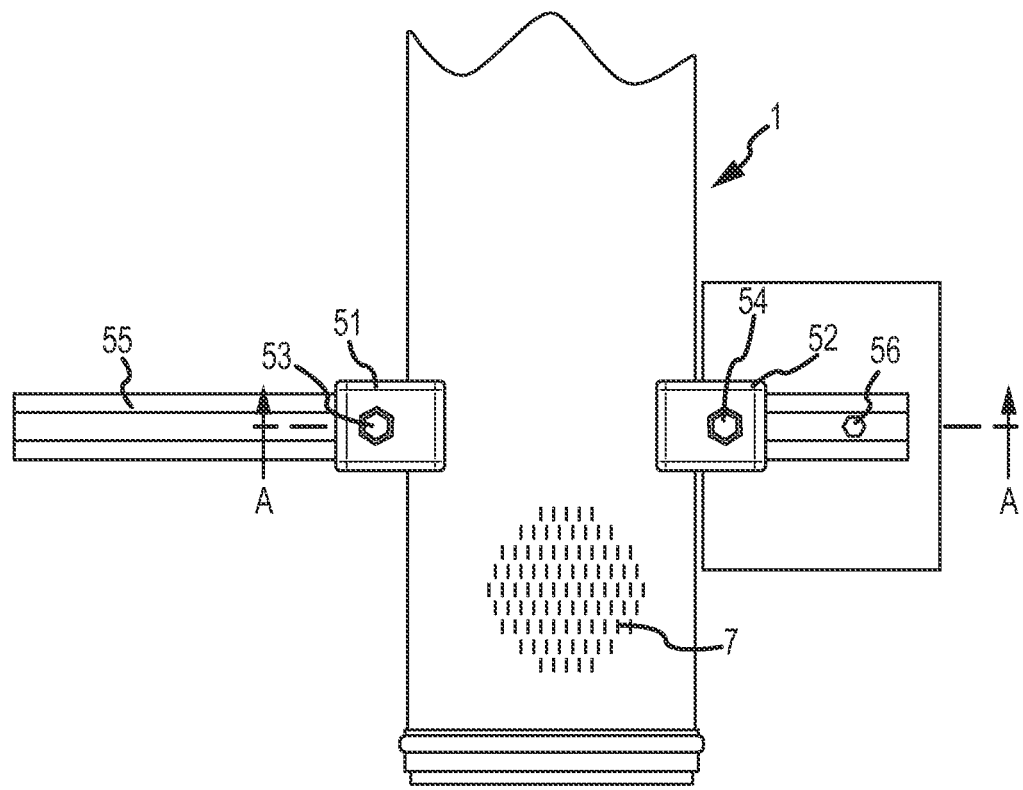
Figure 11C:
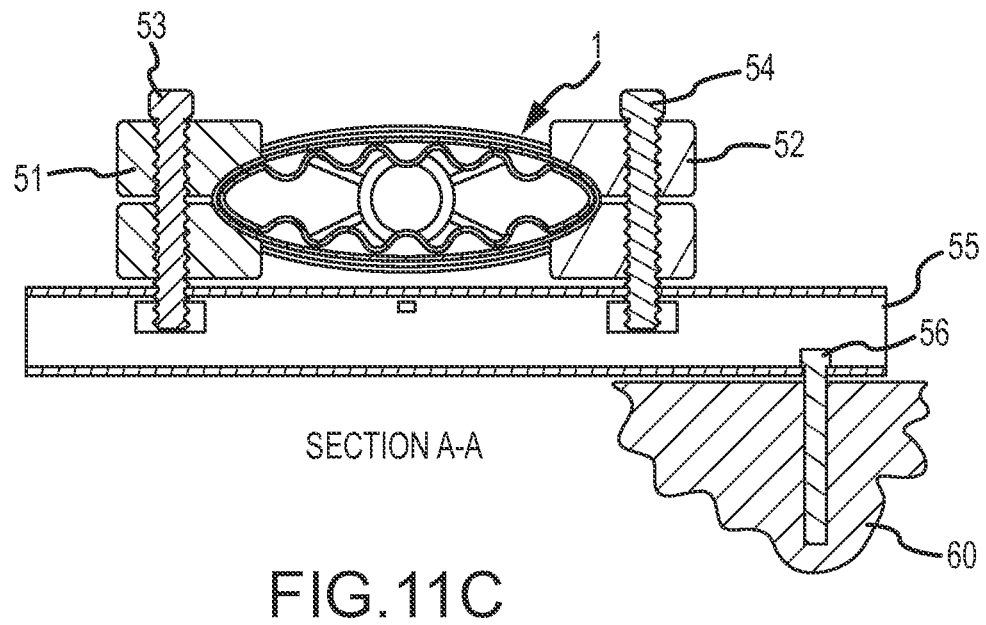

FIG. 11A shows a side view of the mounting assembly 50, profiled bar 55, and securing bolt and nut assembly 56. FIG. 11B shows a top view of the mounting assembly 50 and aeration element 50, and FIG. 11C shows a cross sectional view mounting assembly 50 in place to hold the aeration element 1 in position as described above. Again, depending on the length of the aeration element(s) 1 and/or depth at which the aeration elements 1 are position, according to the specific application, one or more of such mounting assemblies 50 may be utilized to stabilize and secure the aeration elements 1.

Figure 12A:
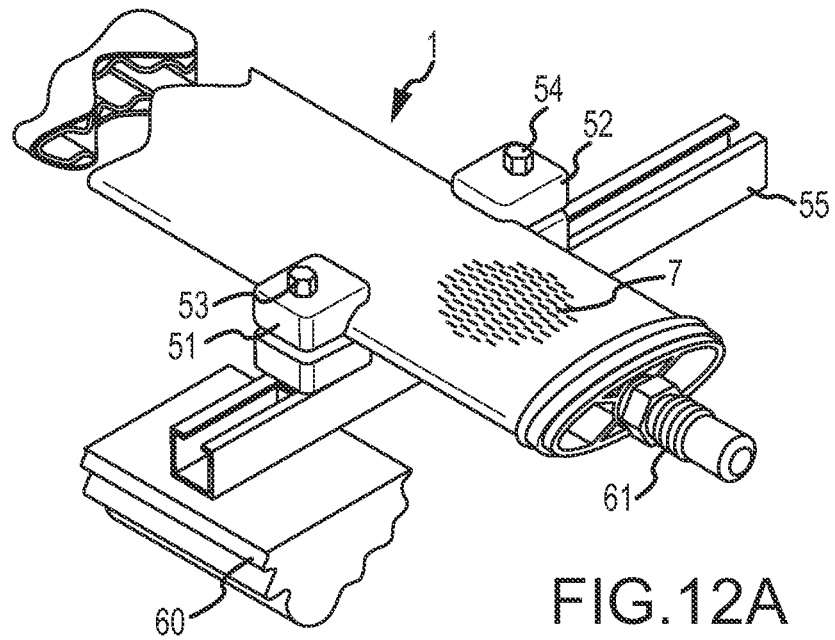
FIGS. 12A-12B are plan view of the mounting assembly of FIG. 11 and showing the threaded hose coupling and flexible hose connected thereto.
Figure 12B:
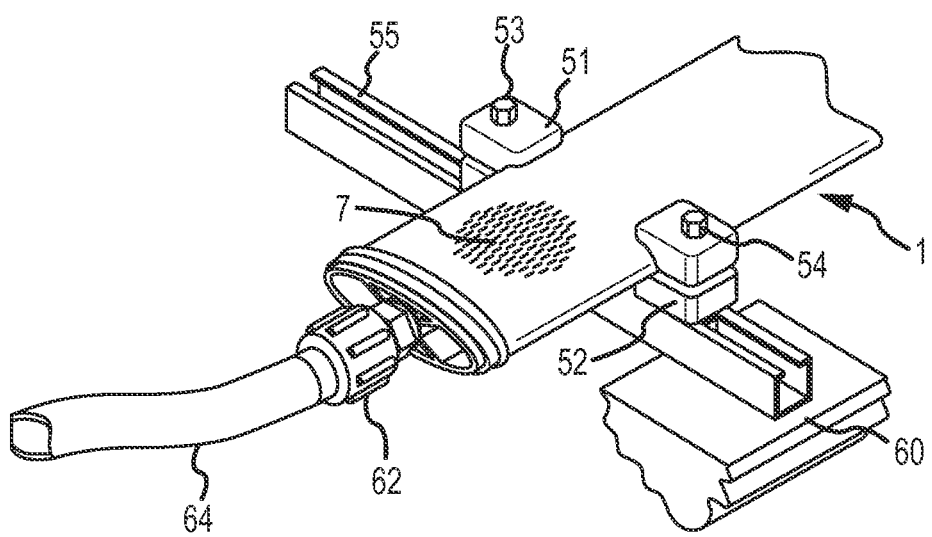
Figure 13:
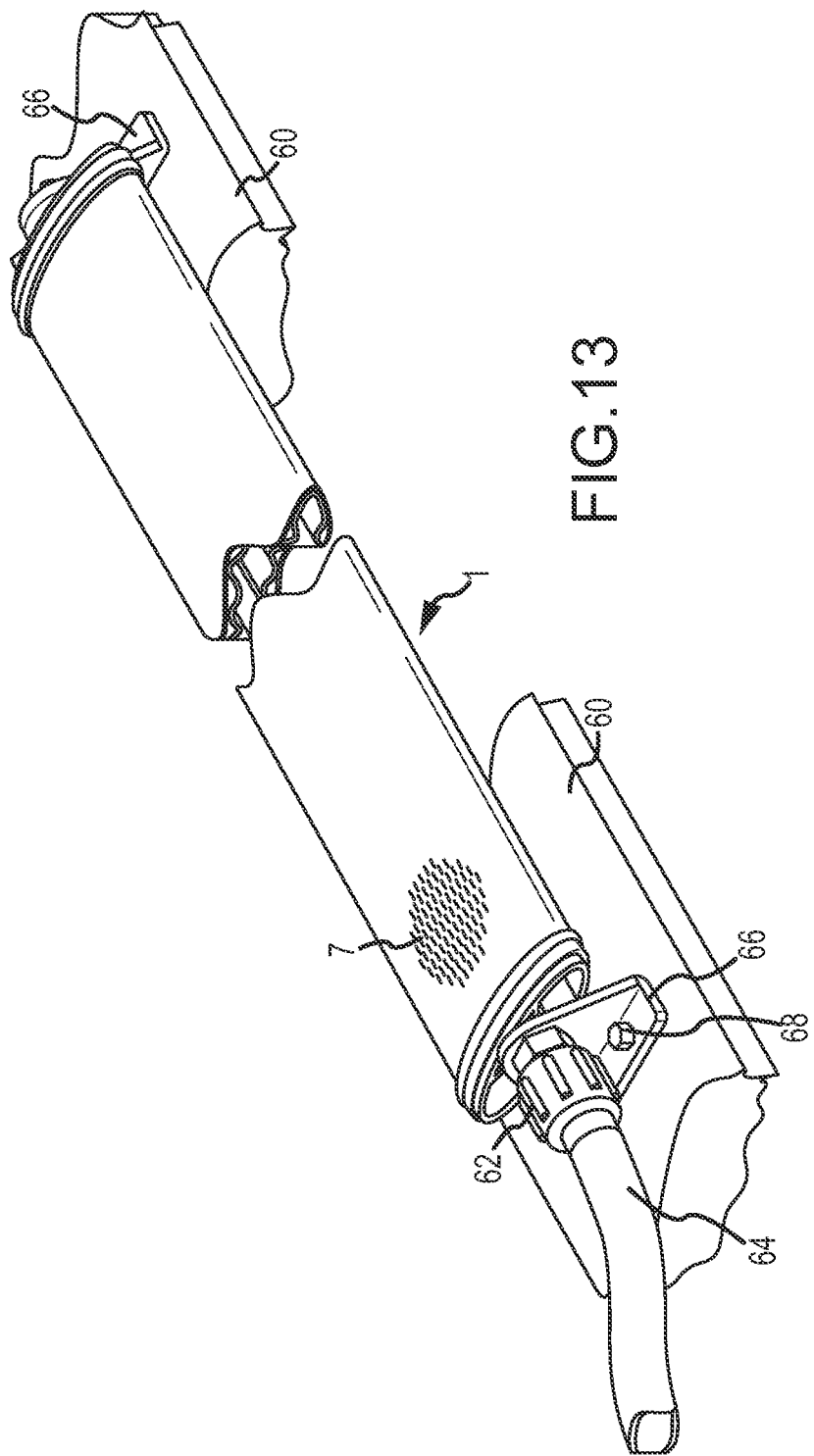
FIG. 13 is a plan view of a further embodiment of a mounting bracket assembly.
Figure 13A:
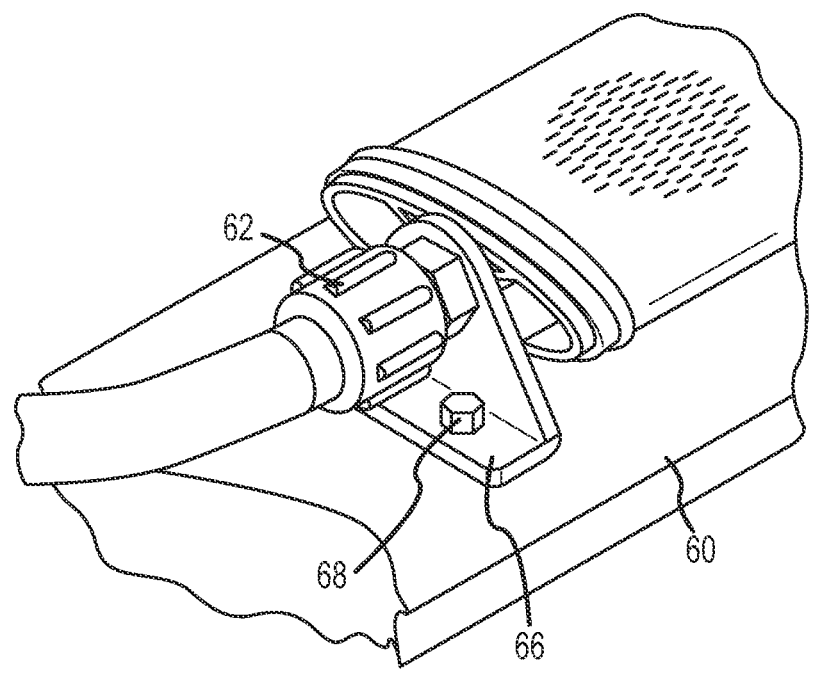
FIGS. 13A-13C shows further details of the mounting bracket assembly of FIG. 13.
Figure 13B:
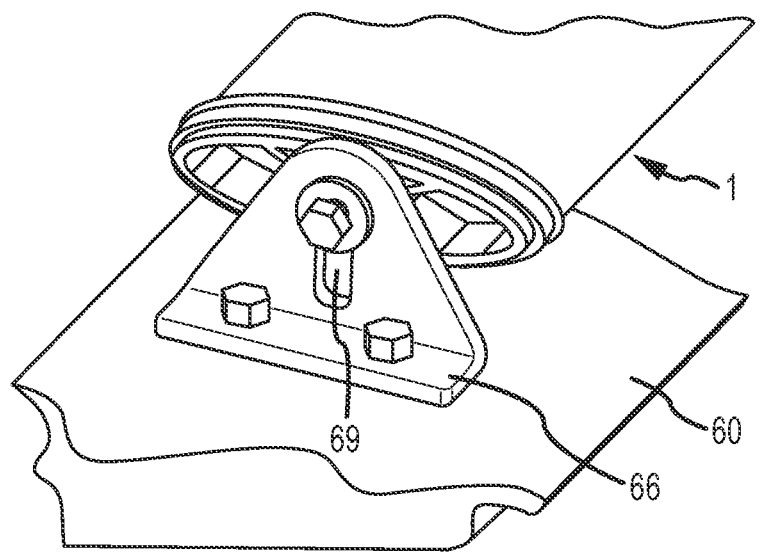

FIGS. 12, 12A and 12B show the mounting bracket assembly of FIG. 11. In this embodiment, a first type of coupling for connecting the aerator element 1 to an air supply is shown by way of example. A threaded adapter or coupling 61 for connecting any type of material hose using a band clamp is utilized in a commonly known manner, with the coupling 61 being received in the air port connection 8. FIGS. 13, 13A, 13B, and 13C show an embodiment of an adjustable mounting bracket 66 for securing one or both ends of the aeration element to the bottom or floor 60 of the tank containing the liquid to be aerated. The adjustable mounting bracket 66 can be cemented and secured by bolts 68 onto a concrete floor, for example. The bracket 66 includes a recess for accommodating a further bolt 69 that enables the height/position of the bracket 66 to be adjustable in order to level the aerator element 1. FIG. 13A shows a threaded hose coupling 62 as a second type of coupling that can be used to connect the aerator element 1 to an air supply, along with a flexible hose 64 that is connected to a cooperating threaded coupling received in the air port connection 9. FIG. 13B shows the end of the aeration element 1 (opposite the end of the aeration element 1 to which the hose 64 is connectable), likewise secured by the mounting bracket 66 to a bottom or floor 60 of the tank.

Figure 13C:
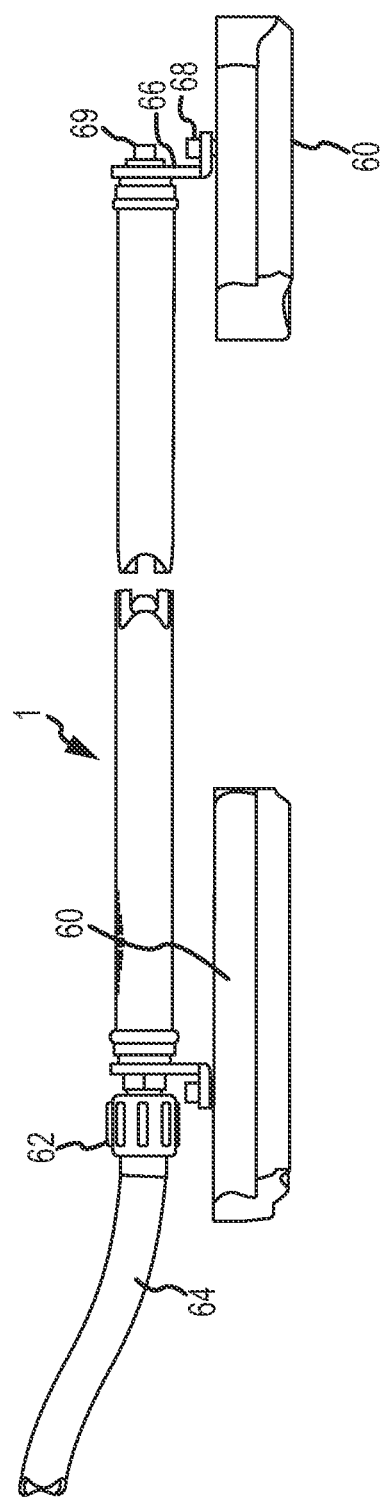

FIG. 13C shows a side view of the aeration element 1 with mounting brackets 66 securing it to the floor 60 at opposite ends and with a threaded hose coupling 62 and flexible hose 64 attached.

Figure 14:
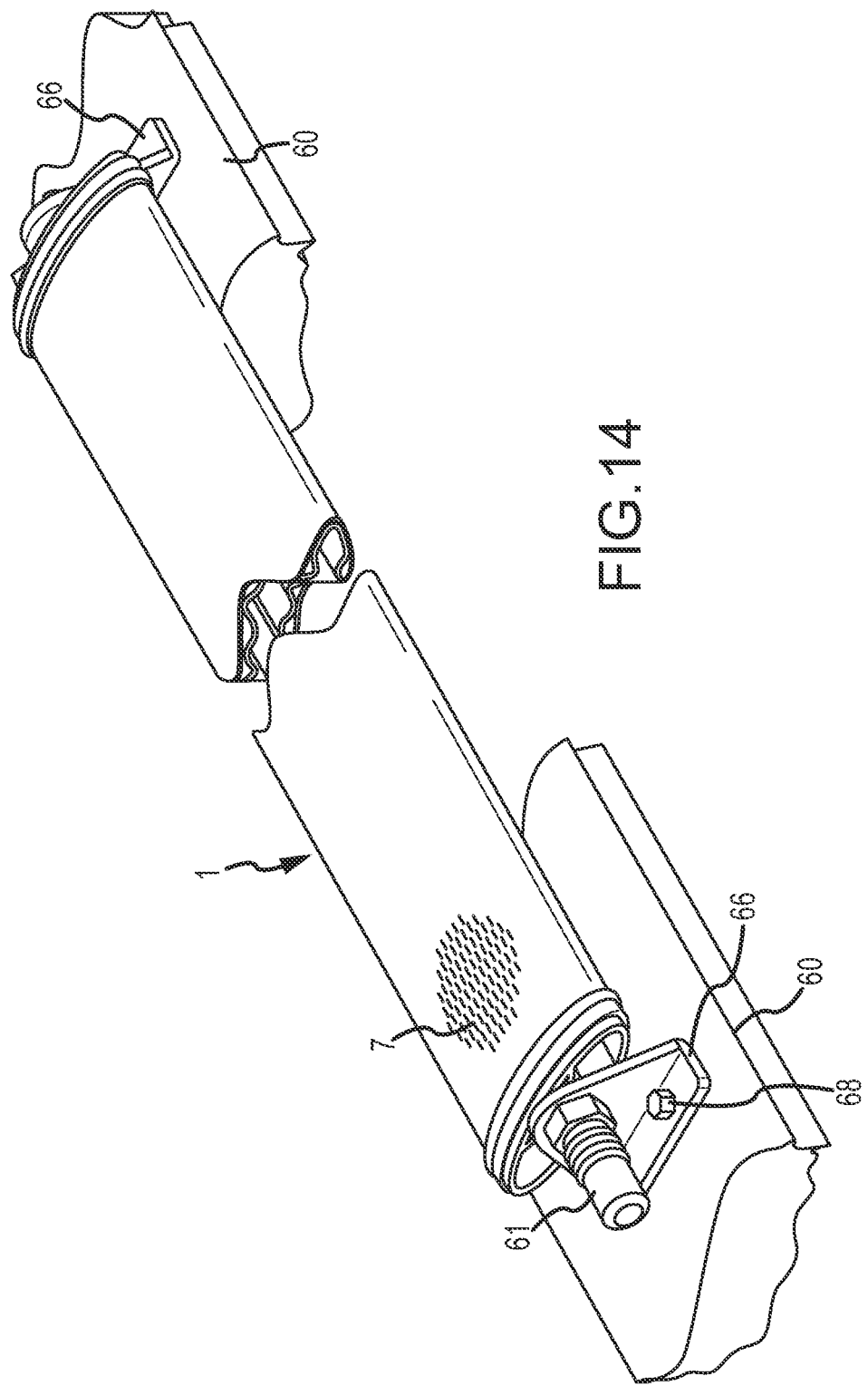
FIG. 14 shows a further plan view of the mounting bracket assembly with a threaded hose coupling.
Figure 14A:
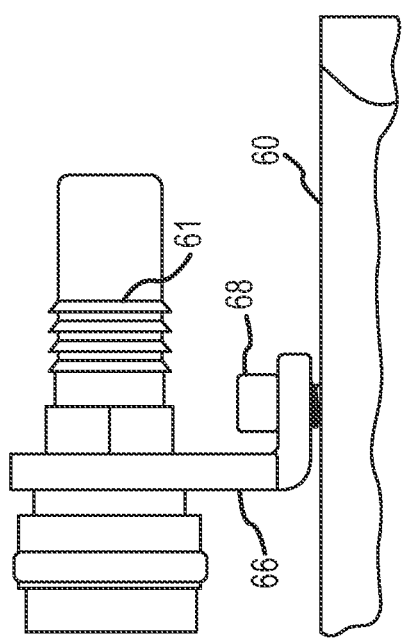
FIGS. 14A-14B show further views of the mounting bracket assembly and hose coupling of FIG. 14.
Figure 14B:
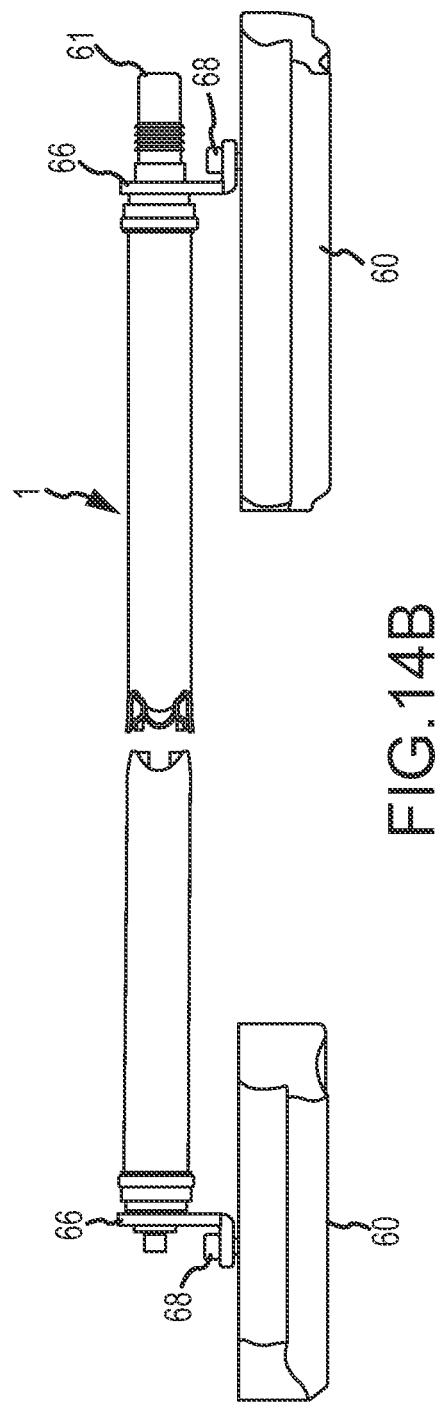

Finally, FIGS. 14 through 14B show the adjustable mounting bracket 66 again securing opposite ends of the aeration element 1 to the floor or bottom 60 of a tank, but illustrates also the threaded adapter or connection 61 provided to receive a threaded hose coupling 62 and flexible hose 64 for supply air to the device.

The above-described features of the inventive aerator element 1 provide for an improved and stable distribution of air bubbles to the liquid to be aerated at a low air flow rate, thus enhancing energy efficiency.

Further, the inventive structure of the aerating element as an essentially flattened element with an oval cross section provides a greater surface area efficiency than known aeration devices that utilized round or tubular aeration elements, as discussed above. Further, the inventive corrugated profile of the support element in conjunction with the flexible sleeve provides increased longevity of the sleeve, preventing folds and creases in the sleeve that lead to fatigue and/or tearing of the elastomeric sleeve material, which can cause operating failure and damage to the aerating assembly.

The specification incorporates by reference the disclosure of German priority document DE 101 50 180.3 filed Oct. 12, 2001, U.S. Pat. No. 7,497,421, and U.S. Pat. No. 6,769,673.

The present invention is, of course, in no way restricted to the specific disclosure of the specification and drawings, but also encompasses any modifications within the scope of the appended claims.

The invention claimed is:

1. An aeration element for gasification or aeration of liquids, comprising:
   a rigid support element having flattened, oppositely disposed, corrugated outer surfaces and an oval cross-section, wherein said oppositely disposed corrugated outer surfaces define at least one chamber therebetween and have at least two ridges defining grooves therebetween;
   a threaded opening for receiving a cooperating fitting for a sealed connection to an air supply;
   a flexible membrane disposed around said support element, said membrane having a plurality of slits disposed therein, and wherein compressed gas is introduced between said support element and said membrane and can escape via slits into a liquid that is to be gasified; and
   at least one retaining clamp for holding said membrane around at least one end of said support element.

2. The aeration element according to claim 1, further comprising a check valve assembly for preventing backflow of debris into an interior of said support element, said check valve assembly comprising an opening formed in the support element and a flexible band positioned around a circumference of said support element and covering said opening for sealing said opening from said debris.

3. The aeration element according to claim 2, wherein said support member includes a stepped portion around at least one end, said stepped portion including a recessed area for receiving the flexible band of said check valve assembly.

4. The aeration element according to claim 1, wherein said membrane has an inside circumference equal to the outside circumference of said support element.

5. The aeration element according to claim 1, wherein said membrane of elastomeric material includes a raised bead that is accommodated in a cooperating recess on said clamp and a plurality of grips for maintaining position of said at least one clamp and said membrane about the support element.

6. The aeration element according to claim 1, wherein the membrane is made of a material selected from the group consisting of EPDM, silicone, polyurethane, polymeric thermoset, and thermoplastic elastomers.

7. The aeration element according to claim 1, wherein the support element comprises a rigid material made of plastic, aluminum or stainless steel.

8. The aeration element according to claim 1, wherein the threaded opening in the support element is connected to an air supply hole for supplying an air flow into an interior of said support element.

9. The aeration element according to claim 1, wherein a plurality of radial ribs extend outwardly from said threaded opening, said radial ribs being configured to direct a flow of supplied air toward an interior of the support element.

10. An aeration element for gasification or aeration of liquids, comprising:
    a rigid support element having a substantially oval cross-section and corrugated outer surfaces, said corrugated outer surfaces including ridges defining grooves therebetween;
    a threaded opening for receiving a cooperating fitting for a sealed connection to an air supply;
    a flexible membrane disposed around said support element, said membrane having a plurality of slits disposed therein, and wherein compressed gas is introduced between said support element and said membrane and can escape via slits into a liquid that is to be gasified;
    at least one retaining clamp for holding said membrane around at least one end of said support element; and
    a check valve assembly for preventing backflow of liquid, particles or sludge if the membrane is breached unintentionally by an external force into an interior of said support element, said check valve assembly comprising an opening formed in the support element and a flexible band positioned around a circumference of said support element and covering said opening for sealing said opening from said liquid, particles, or sludge.

11. The aeration element according to claim 10, wherein said support member includes a stepped portion around at least one end, said stepped portion including a recessed area for receiving the flexible band of said check valve assembly.

12. The aeration element according to claim 10, wherein said membrane has an inside circumference equal to the outside circumference of said support element.

13. The aeration element according to claim 10, wherein said membrane of elastomeric material includes a raised bead that is accommodated in a cooperating recess on said clamp and a plurality of grips for maintaining position of said at least one clamp and said membrane about the support element.

14. The aeration element according to claim 10, wherein the membrane is made of material selected from the group consisting of EPDM, silicone, polyurethane, polymeric thermoset, and thermoplastic elastomers.

15. The aeration element according to claim 10, wherein the support element comprises a rigid material made of plastic, aluminum or stainless steel.

16. The aeration element according to claim 10, wherein the threaded opening in the support element is connected to an air supply hole for supplying an air flow into an interior of said support element.

17. The aeration element according to claim 10, wherein a plurality of radial ribs extend outwardly from said threaded opening, said radial ribs being configured to direct a flow of supplied air toward an interior of the support element.

18. The aeration element according to claim 10, further comprising a mounting assembly for securing the aeration element to a surface, said mounting assembly adapted to prevent vertical and horizontal movement of the aeration element in a submerged state.

19. The aeration element according to claim 18, wherein the surface is the floor or bottom of a tank or pool containing the liquid to be gasified.

20. The aeration element according to claim 18, wherein the mounting assembly comprises at least one adjustable flange for securing the aeration element therebetween; a profiled rail, wherein said at least one flange is secured to said profiled rail; and a threaded bolt connection for securing said profiled rail to said surface.

* * * * *